United States Patent [19]

Sano et al.

[11] 3,872,507

[45] Mar. 18, 1975

[54] ROTATING AIR BEARING HEAD WITH SHAPED CONTROL SLOTS

[75] Inventors: Kazuhiko Sano; Shoji Omiya, both of Osaka, Japan

[73] Assignee: Matsushita Electric Industrial Co., Ltd., Kadoma-shi, Osaka, Japan

[22] Filed: Feb. 2, 1973

[21] Appl. No.: 328,957

[30] Foreign Application Priority Data

| | | |
|---|---|---|
| Feb. 4, 1972 | Japan | 47-13073 |
| Mar. 17, 1972 | Japan | 47-27752 |
| Mar. 17, 1972 | Japan | 47-27753 |
| Mar. 17, 1972 | Japan | 47-27784 |
| Apr. 14, 1972 | Japan | 47-44890[U] |
| May 16, 1972 | Japan | 47-57417[U] |

[52] U.S. Cl. .................. 360/102, 360/101, 360/122

[51] Int. Cl. .......................... G11b 5/60, G11b 5/22

[58] Field of Search ............ 360/102, 103, 84, 122, 360/130, 101

[56] References Cited

UNITED STATES PATENTS

| | | | |
|---|---|---|---|
| 3,623,042 | 11/1971 | Woemler | 360/102 |
| 3,643,037 | 2/1972 | Norwood | 360/102 |
| 3,821,813 | 6/1974 | Freeman et al. | 360/102 |

*Primary Examiner*—Terrell W. Fears
*Assistant Examiner*—Robert S. Tupper

[57] ABSTRACT

A magnetic recording and reproducing device is disclosed in which one magnetic head or a plurality of magnetic heads are so disposed upon a rotary drum as to extend beyond the outer peripheral surface thereof with the slit gap or gaps in parallel with the axis of rotation of the rotary drum. Recesses are formed on both sides of the magnetic head in the outer peripheral surface of the rotary drum, and the point of the maximum thickness of the magnetic head which is generally similar in cross sectional configuration to an airfoil is located ahead of the midpoint or center of the magnetic head but behind the leading edge thereof. Both side edges of the magnetic head are rounded between the trailing edge and a point very close to the slit gap thereof.

6 Claims, 20 Drawing Figures

ROTATING AIR BEARING HEAD WITH SHAPED CONTROL SLOTS

BACKGROUND OF THE INVENTION

The present invention relates generally to a magnetic recording and reproducing device and more particularly the construction and arrangement of magnetic recording and reproducing heads upon a rotary drum of the magnetic recording and reproducing device.

There has been known in the art the magnetic recording and reproducing device of the type in which one magnetic head or a plurality of magnetic heads are juxtaposed on a rotary drum in such a manner that they are extend beyond the outer peripheral surface of the rotary drum with their slit gaps parallel with the axis of rotation of the rotary drum. A magnetic tape is wrapped therearound in closely spaced apart relation therewith through a very thin air film or layer, whereby the information may be recorded on or reproduced from the magnetic tape upon rotation of the rotary drum at a high speed. However, the air stream layer between the magnetic tape and the rotary drum is generally not formed as desired, and in some cases the magnetic tape makes contact with the magnetic head or heads. As a result, the recording and reproducing efficiency or characteristics are not satisfactory, and the service lives of both the magnetic heads and the tape are short because of their contact resulting in the rapid wear and abrasion thereof. However, there has not been proposed yet a satisfactory means for solving these problems.

SUMMARY OF THE INVENTION

One of the objects of the present invention is therefore to provide an improved magnetic recording and reproducing device in which the optimum air stream layer may be positively formed in operation between a magnetic tape and magnetic head or heads by the simple construction and arrangement of the magnetic head or heads.

Briefly stated, according to the present invention, on both sides of each magnetic head are formed recesses in the outer peripheral surface of a rotary drum or spacers along the whole length of the magnetic head, at least the leading edge of each recess being below the outer peripheral surface of the rotary drum or spacers. The bottom of the recess becomes gradually deeper from the trailing edge toward the deepest point from which the bottom becomes gradually shallower toward the trailing edge. A part of the air stream which separates the magnetic tape from the magnetic heads flows into the recesses and serves to push the magnetic tape upwardly thereby separating it from the magnetic head when the air flows along the bottom of the recess which becomes gradually shallower toward the trailing edge. In other words, the thin air layer may be positively formed between the magnetic tape and the magnetic head over the rear portion thereof so that the magnetic tape may be prevented from making contact with the magnetic head.

The air layer formed between the magnetic tape and the magnetic head is preferably always maintained stable and serves to improve the recording and reproducing characteristics such as the density of the information recorded upon the magnetic tape, the output levels, the SN ratio and the like. Therefore, according to the present invention, the point of the maximum thickness of the magnetic head which extends out of the outer peripheral surface of the rotary drum with the cross sectional configuration similar to airfoil is located ahead of the midpoint or center of the magnetic head but behind the leading edge thereof, and the thickness of the magnetic head is reduced more rapidly from the point of the maximum thickness toward the leading edge than from the point of the maximum thickness toward the trailing edge. Therefore, the air layer formed between the magnetic tape and the magnetic head, in accordance with the present invention, becomes thinner than that formed between the magnetic tape and the prior art magnetic heads. Furthermore, the thickness of the air layer, that is, the spacing between the magnetic tape and the magnetic head may be maintained uniformly over a considerable length on both sides of the slit air gap of the magnetic head so that the magnetic recording and reproducing characteristics may be remarkably improved.

As described above, a part of the air stream flows into the recesses on both sides of the magnetic head at the trailing edge thereof and serves to form an air layer between the magnetic tape and the magnetic head over the rear portion thereof. Therefore, the air layer may be formed positively by selecting the optimum volume of the air flowing into the recesses at the leading edge of the magnetic head and forming the air layer with a relatively smaller thickness over the forward portion of the magnetic head. Thus, the efficiency of the magnetic head may be considerably improved, and the outputs from the inlet and outlet portions of the thin air layer may be made substantially equal. Furthermore, according to the present invention, the side edges of the magnetic head from the leading edge and a point very close to the slit gap thereof are rounded in order to ensure that the objects of the present invention may be more positively accomplished.

The above and other objects, features and advantages of the present invention will become more apparent from the following description of some preferred embodiments thereof taken in conjunction with the accompanying drawings.

DESCRIPTION OF THE PREFERRED EMBODIMENTS

Figure 1:
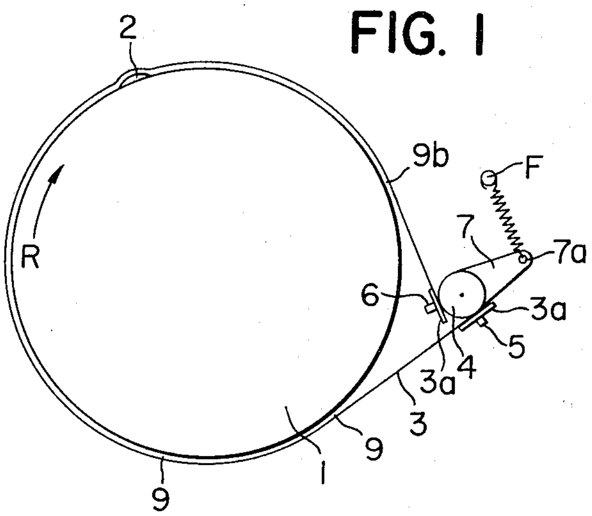
FIG. 1 is a plan view of a rotary head type magnetic recording and reproducing device to which is applied the present invention.

FIG. 1 illustrates a magnetic recording and reproducing system employing the present invention. A cylindrical drum 1 which is driven in the direction indicated by the arrow R has a magnetic head 2 extending beyond of the outer periphery of the rotary drum 1 and a magnetic tape 3 wrapped therearound for recording and reproducing the information through the magnetic head 2. Both ends of the magnetic tape 3 are securely fixed to tape supports 3*a* which in turn are fixed with pins 5 and 6 to a tape supporting post 4 which has a circular cross sectional configuration and is so disposed as to be rotatable about its axis. A biasing spring 8 is loaded between a stationary member F and the free end 7*a* of a crank arm 7 so that the rotary tape supporting post 4 may be normally biased in the direction opposite to that of the rotation of the rotary drum 1. Therefore, the magnetic tape 3 is normally subjected to a tension in the direction opposite to that of the rotation of the rotary drum 1, and when the rotary drum 1 rotates at high speed a thin air layer 9 is formed between the magnetic tape 3 and the outer periphery of the rotary drum 1.

Figure 2A:
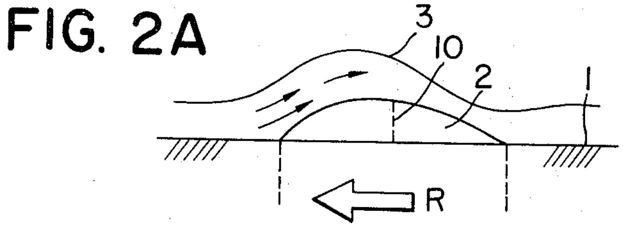
FIGS. 2A and 2B are views used for the explanation of the air layer formed between the magnetic tape and the magnetic head.

The relation between the magnetic head 2 and the magnetic tape 3 when the rotary drum 1 is rotated at high speed is illustrated in detail in FIG. 2A. Since the magnetic head 2 extends beyond the peripheral surface of the rotary drum 1, the air stream flowing between the magnetic tape 3 and the rotary drum changes its direction along the upper surface of the magnetic head 2 so that the magnetic tape 3 is spaced apart from the slit gap of the magnetic head 2 by a large distance that is unpractical from the standpoint of recording and reproducing. Therefore, the information cannot be recorded on or reproduced from the magnetic tape 3 with a desired degree of accuracy. This phenomenon is more pronounced when a plurality of magnetic heads are juxtaposed in the direction of the axis of the rotary drum 1.

Figure 2B:
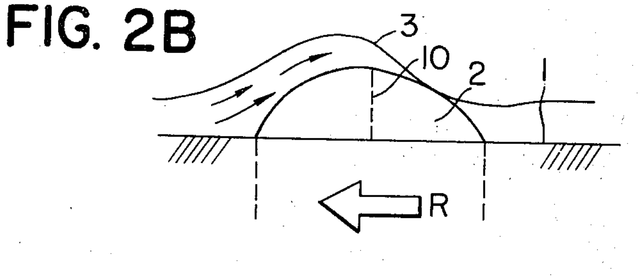

When the extension of the magnetic head 2 beyond the peripheral surface of the rotary drum is increased in order to minimize the spacing between the magnetic tape 3 and the magnetic head 2, the magnetic tape 3 makes contact with the rear or trailing portion of the magnetic head 2 as shown in FIG. 2B so that wear on of both magnetic head 2 and tape 3 increase rapidly and their service lives become shorter.

Referring back to FIG. 1, the thickness of the air layer 9 between the rotary drum 1 and the magnetic tape 3 is smaller at the outlet 9*b* than at the inlet 9*a* because the air escapes to the exterior. The thickness of the air layer at or close to the inlet 9*a* measured under some conditions was 35 $\mu$m whereas the thickness at or close to the outlet 9*b* was 15 $\mu$m. The spacing between the magnetic head 2 and the magnetic tape 3 varies in the longitudinal direction of the tape accordingly.

Figure 3:
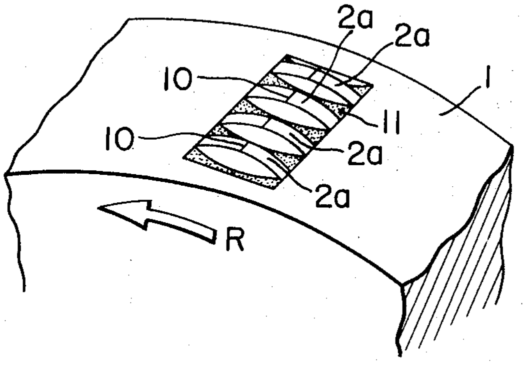
FIG. 3 is a fragmentary perspective view of one embodiment of the present invention.

One embodiment of the multi-magnetic-head assembly, in accordance with the present invention, is illustrated in FIG. 3. A plurality of magnetic heads 2a which have the slit gaps 10 and extend beyond the peripheral surface of the rotary drum 1 are juxtaposed in the direction of the axis of rotation of the rotary drum 1 and are spaced apart from each other by recesses 11 to be described in more detail hereinafter.

Figures 4, 5, 6A, 6B:
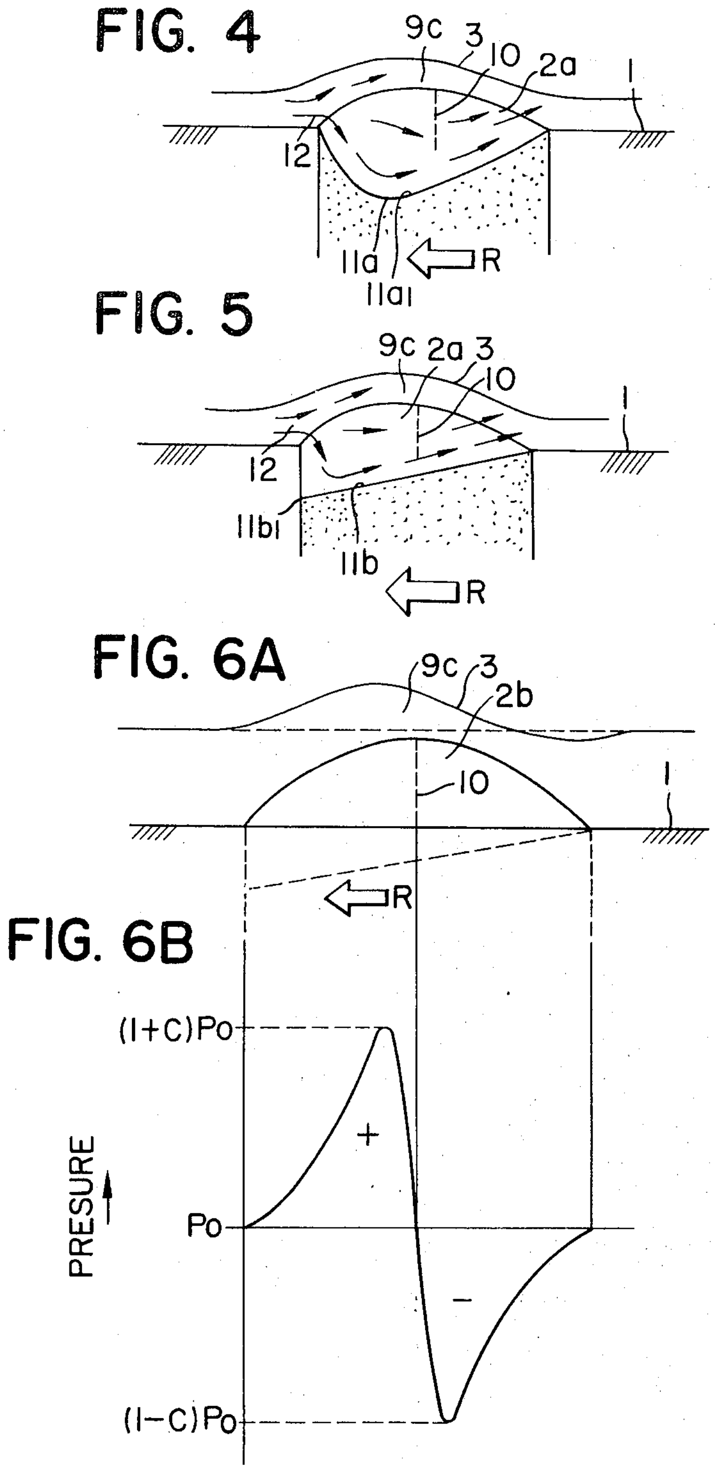
FIGS. 4 and 5 are sectional views of the recesses formed on both sides of the magnetic head in accordance with the present invention.
FIG. 6A is a sectional view of the magnetic head in which the forward and rear portions thereof are symmetrical about the center line thereof.
FIG. 6B illustrates the pressure distribution curve of the air stream between the magnetic tape and the magnetic tape and the magnetic head shown in FIG. 6A.

One example of the cross sectional configuration of the recess 11 is illustrated in FIG. 4. In general, the recesses 11*a* are formed in the rotary drum 1 on both sides of each magnetic head 2*a* along the whole length of the magnetic head 2*a*. The angle of inclination between the portion extending from the leading edge of the recess 11*a* to the deepest position $11a_1$ thereof is steep whereas the angle of inclination of the segment between the deepest position $11a_1$ and the trailing edge of the recess 11*a* is gentle. Therefore, the deepest position $11a_1$ in the recess 11*a* is positioned forwardly of the center of the recess 11*a*.

As the rotary drum 1 rotates in the direction R, the air stream 12 flows between the magnetic head 2 and the magnetic tape 3 and into the recess 11*a* as indicated by the arrows. The air stream 12 flowing into the recess 11*a* reverses its direction at the deepest point $11a_1$ and flows along the rear bottom surface of the recess 11a so that the air stream 12 serves to push the magnetic tape 3 upwardly in the rear portion of the recess 11*a*. Therefore, in the front portion of the magnetic head 2*a*, the spacing between the head 2*a* and the magnetic tape 3 may be prevented from increasing as shown in FIG. 2A whereas along the rear portion of the magnetic head 2*a*, the magnetic tape 3 is prevented from coming into contact with the head 2*a* as shown in FIG. 2B. Therefore, the air stream 12 flowing over the upper surface of the magnetic head 2*a* may form a uniform thin air layer 9*c* along the whole length thereof so that not only the overall efficiency of the magnetic head 2*a* may be increased but also the difference in efficiency between the inlet 9*a* and the outlet of the air layer 9*c* may be minimized.

In the embodiment shown in FIG. 5, the forward edge in the cross sectional configuration of the recess 11*b* extends at a very acute angle almost close to 90° from the leading edge of the recess 11*b* to the deepest point $11b_1$ thereof, and the rear bottom extends in a straight but at a very gentle angle of inclination from the deepest point $11b_1$ to the trailing edge of the recess 11*b*. In other words, unlike the embodiment shown in FIG. 4, the recess 11b becomes suddenly deep from the leading edge and then shallower and shallower toward the trailing edge so that the negative pressure at or close to the leading edge of the recess 11*b* is considerably increased. Therefore, the air stream 12 flowing between the magnetic head 2*a* and the magnetic tape 3 is more attracted toward the forward portion of the recess 11$b$ than in the embodiment shown in FIG. 4 and the volume of the air stream which serves to push the magnetic tape 3 upwardly is increased in the rear portion of the recess 11$b$. Therefore, the tape 3 is more attracted toward the forward portion of the upper surface of the magnetic head 2$a$ than in the embodiment shown in FIG. 4 whereas the magnetic tape 3 is positively spaced apart from the rear portion of the magnetic head 2$a$. Thus, an air stream layer 9$c$ whose thickness is almost uniform along the whole length of the magnetic head 2$a$ may be formed.

Figures 7A, 7B:
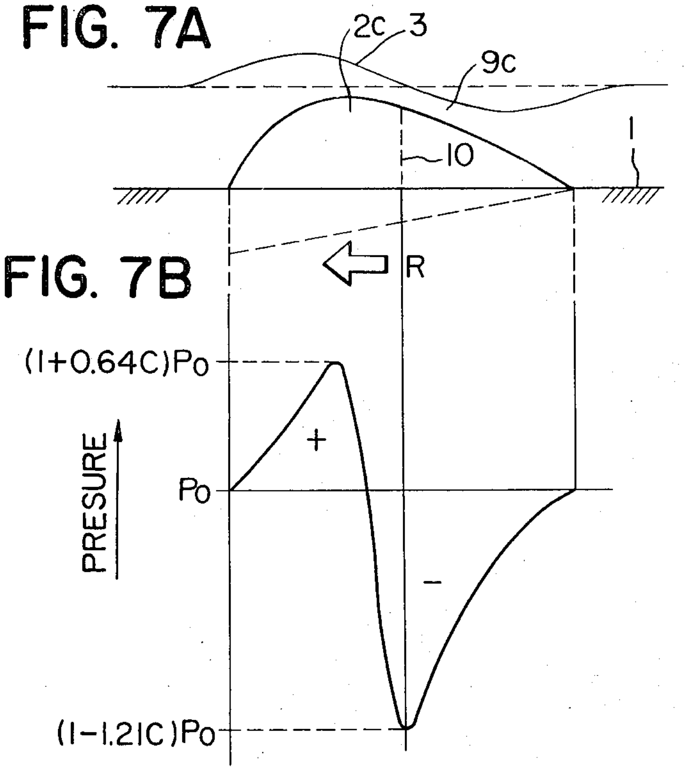
FIG. 7A illustrates the profile of the magnetic head in accordance with the present invention.
FIG. 7B illustrates the pressure distribution of the air stream between the magnetic tape and the magnetic head shown in FIG. 7A.

The formation of the air stream layer 9$c$ is also dependent upon the profile of the magnetic head 2 and especially of the configuration of the leading edge thereof. FIG. 6A illustrates the profile of the magnetic head 2$b$ in which the forward and rear portions are symmetrical about the slit gape 10, and FIG. 7A illustrates the section of the magnetic head 2$c$ in which the point of the maximum thickness is ahead of the center of the magnetic head 2$c$ and the thickness in the forward portion is rather rapidly decreased from the point of the maximum thickness to the leading edge while the thickness in the rear portion is gradually decreased from the point of the maximum thickness to the trailing edge. Therefore, the magnetic tapes 3 pass over the magnetic heads 2$b$ and 2$c$ as shown in FIGS. 6A and 7A, respectively, and the pressure distributions of the air stream layers 9$c$ flowing between the upper surface of the magnetic heads and the magnetic tapes are shown in FIGS. 6B and 7B, respectively. By the comparison between the profiles of the magnetic heads 2$b$ and 2$c$ shown in FIGS. 6A and 7A, it is readily seen that the thickness of the air stream layer 9$c$, that is, the spacing between the upper surface of the magnetic head 2$c$ and the magnetic tape 3 is more uniform in the embodiment shown in FIG. 7A than in the magnetic head shown in FIG. 6A. Similarly, the spacing between the magnetic tape 3 and the slit gap 10 of the magnetic head 2$c$ is maintained in a more stable manner in the embodiment shown in FIG. 7A than in the magnetic head shown in FIG. 6A.

The mode of the floating travel of the magnetic tape 3 past over the magnetic head 2 may be determined from the pressure distribution over the upper surface of the magnetic head between it and the magnetic tape 3. It is assumed in the following calculation of pressure distribution that the magnetic tape will not deform itself relative to the magnetic head. The deformation of the magnetic tape in practice or the path of the travel of the magnetic tape 3 over the magnetic head 2 may be estimated from the pressure distribution curve because the magnetic tape deforms itself or travels over the magnetic head in such a manner that there will be no pressure difference above the magnetic head.

The pressure distribution may be approximately obtained from the Stoke's flow approximation which is the simplified form of the Navier-Stokes equation well known in the law of hydrodynamics $$\mu \nabla^2 u_i = \delta p / \delta x_i$$

and from the equation of continuity $$\delta u_i / \delta x_i = 0$$

where $\mu$ = coefficient of viscosity of air;

$u_i$ (where $i$ = 1, 2, and 3) = air velocity vector in the Cartesian coordinate system ($x_1$, $x_2$ and $x_3$);

$p$ = air pressure, and $\nabla^2$ = Laplace operator

The pressure distribution curves shown in FIGS. 6B and 7B were obtained from the above equations. In FIGS. 6B and 7B, $P_0$ designates the air pressure between the magnetic tape and the rotary drum, and C, a constant which is determined depending upon the number of rotations of the rotary drum per minute, and the tension applied to the magnetic tape. In case of the magnetic head having the profile as shown in FIG. 7A, the positive pressure at the forward portion between the leading edge and point of the maximum thickness of the magnetic head 2$c$ is relatively small and the point of the maximum positive pressure is located ahead of the slip gap 10 toward the leading edge. The negative pressure which serves to attract the magnetic tape toward the magnetic head is relatively greater and the point of the maximum negative pressure is located very closely to the slit gap 10. Therefore, the relatively uniform air stream layer 9$c$ may be formed over the magnetic head 2$c$ on both sides of the slit gap 10 thereof as shown in FIG. 3.

So, far, only the influence of the profile of the magnetic head upon the path of travel of the magnetic tape over the magnetic head has been discussed, but the cross sectional configuration of the multi-magnetic-head assembly along the plane at a right angle to the path of travel of the magnetic tape also influences the path of travel of the magnetic tape, that is, the spacings between the magnetic tape and the slit gaps of the multi-magnetic-head assembly.

Figure 8:
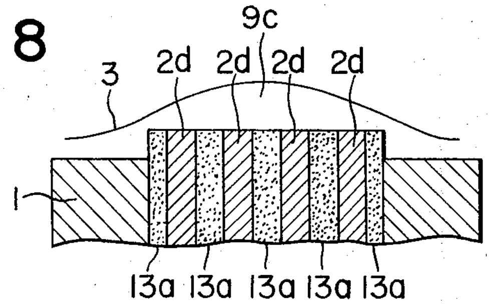
FIG. 8 is a view illustrating the cross sectional configuration of the magnetic tape which travels over the multi-magnetic-head assembly in which the magnetic heads are spaced apart from each other by the spacers equal in height to the magnetic heads.

When the individual magnetic heads 2$d$ and the spacers 13a are all the same height as shown in FIG. 8, the cross sectional configuration of the magnetic tape 3 is convex because the air at both sides of the magnetic tape can escape more freely than at the center. Therefore, the magnetic tape 3 moves toward the magnetic heads at the sides more closely than to the magnetic head at the center so that there arises the difference in efficiency between the magnetic head disposed at the center and those disposed on the sides.

Figure 9:
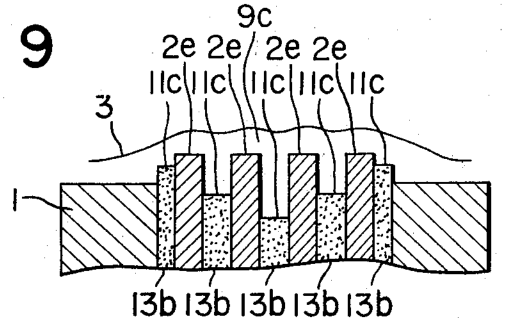
FIG. 9 is a view illustrating the cross sectional view of the magnetic tape passing over the multi-magnetic-head assembly in accordance with the present invention.

In order to solve this problem, as shown in FIG. 9, the heights of the spacers 13$b$ are so varied that they are increased stepwise from the one at the center toward those at the extreme ends so that the force attracting the magnetic tape 3 toward the magnetic head 2$e$ at the center may be increased. As a consequence, the magnetic tape 3 may be maintained relatively flat as shown in FIG. 9, that is, the spacing between the magnetic tape 3 and each of the magnetic heads 2$e$ may be maintained relatively uniformly.

In the arrangement shown in FIG. 9, the outermost spacers 13$b$ are shown as being extending out of the peripheral surface of the rotary drum 1, but it should be noted that at least the leading edge of the spacer 13$b$ is located below the outer surface of the rotary drum 1.

Figure 10A:
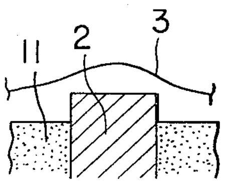
FIGS. 10A and 10B are views illustrating the cross sectional configurations of the magnetic tapes passing over the individual magnetic heads of the multi-magnetic-head assembly.
Figure 10B:
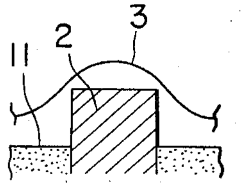

When the relation between the individual magnetic heads 2 and the magnetic tape 3 is considered, it is seen that the magnetic tape 3 still exhibits a convex across sectional configuration as shown in FIGS. 10A and 10B so that the spacing between the magnetic tape and the slit gap of the magnetic head is still greater microscopically. This phenomenon becomes more pronounced when the extension of the magnetic head 2 out of the peripheral surface of the rotary drum 1 is increased or the distance between the top of the magnetic head 2 and the top of the adjacent spacer 11 is increased in an attempt to reduce the spacing between the magnetic head 2 and the magnetic tape 3. In order to overcome this problem, the present invention provides the arrangements as shown in FIGS. 11A – 11E and FIG. 12.

Figure 11A:
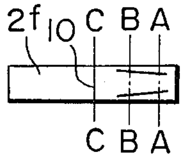
FIG. 11A is a top view of a magnetic head according to another embodiment of the present invention.
Figure 11C:
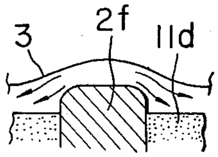
FIGS. 11C, 11D and 11E are cross sectional views taken along the lines A–A, B–B, and C–C of FIGS. 11A and 11B.
Figure 11B:
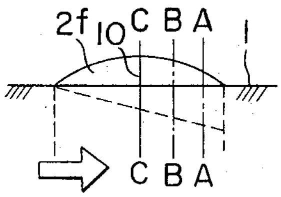
FIG. 11B is a side view thereof.
Figure 11D:
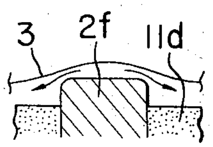
Figure 11E:
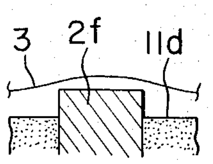

In the embodiment shown in FIGS. 11A – 11E, the side edges of the forward or front portion of the magnetic head 2 are rounded and the curvature of the rounded edge is increased as the side edge approaches the leading edge. This is, the curvature of the rounded side edges is greatest at the leading edge of the magnetic head as shown in FIGS. 11A and 11B and is gradually decreased as the sections A — A, B — B and C — C are moved away from the leading edge as shown in FIGS. 11C, 11D, and 11E. Since the side edges are rounded, the air in the air stream layer 9c may easily escape into the recesses 11d at both sides of the magnetic head 2 so that the magnetic tape 3 as a whole may be more closely moved toward the magnetic head 2. Thus, the satisfactory spacing between the magnetic tape 3 and the slit gap 10 of the magnetic head 2 may be maintained. It should be noted that the side edge at the slit gap 10 is not rounded so that the slit gap may have a predetermined length. The reason why the curvature of the rounded side edges is gradually varied from the leading edge of the magnetic head 2 to a point close to the slit gap 10 is that the air stream may flow smoothly along the top surface of the magnetic head 2 without a sudden change in the flow so as to form a stable thin air layer.

Figure 12:
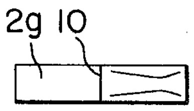
FIG. 12 is a top view of a magnetic head in accordance with a still another embodiment of the present invention.

In the embodiment shown in FIG. 12, the curvature of the rounded side edges of the magnetic head 2*g* is small at the leading edge, is gradually increased to a point away from the leading edge where the curvature becomes the largest and then is gradually reduced toward a point close to the slit gap 10. Since no rounded side edges are formed at the leading edge of the magnetic head 2*g*, this embodiment has the advantage that the magnetic head 2*g* may be easily fabricated yet its effect is not different from the embodiment shown in FIGS. 11A – 11E.

What is claimed is:

1. A device of the type in which a plurality of magnetic heads are juxtaposed in spaced apart relation in the direction of the axis of rotation of a rotary drum on the outer peripheral surface thereof, and a magnetic tape is wrapped around said rotary drum and is spaced apart therefrom through a thin air layer so that signals may be recorded on and reproduced from said magnetic tape upon rotation of said rotary drum at high speed, the improvement wherein on both sides of each of said plurality of magnetic heads said outer peripheral surface of said rotary drum is provided with recesses along the length of said magnetic head, the bottom of said recesses being lower than said outer peripheral surface of said rotary drum and the leading edges of said recesses being lower than said outer peripheral surface of said rotary drum, and the bottom of said recesses becoming gradually shallower toward the trailing edges.

2. A device as defined in claim 1, wherein the plurality of magnetic heads are juxtaposed each other between spacers and said recesses being formed on said spacers.

3. A device as defined in claim 1 where the depth of said recesses gradually increases from the ones located at the outermost sides toward the one located at the center of said plurality of magnetic heads juxtaposed and spaced apart by said recesses.

4. A device as defined in claim 1 wherein each magnetic head extends out of the peripheral surface of said rotary drum, wherein the point of maximum extension of said magnetic head is located ahead of the midpoint of each magnetic head but behind the leading edge thereof, and the extension of each magnetic head rapidly decreases from said point of the maximum extension toward said leading edge than from said point of the maximum extension toward the trailing edge of said magnetic head.

5. A device as defined in claim 1 wherein each magnetic head is provided with a slit gap and both side edges of each magnetic head between the leading edge and the point very close to the slit gap thereof are rounded, the curvature of said rounded side edges being gradually reduced from said leading edge toward the point very close to the slit gap of said magnetic head.

6. A device as defined in claim 1 wherein said recesses are deepest proximate the leading edge and wherein the bottom of said recesses become gradually shallower toward the trailing edge thereof.

* * * * *